United States Patent [19]

Cruzen

[11] Patent Number: 4,984,967
[45] Date of Patent: Jan. 15, 1991

[54] PROPFAN BLADE ERECTION DAMPER

[75] Inventor: Gerald S. Cruzen, Brighton, Mich.

[73] Assignee: Williams International Corporation, Walled Lake, Mich.

[21] Appl. No.: 383,628

[22] Filed: Jul. 24, 1989

[51] Int. Cl.5 ............................................. B64C 27/51
[52] U.S. Cl. ....................................... 416/140; 416/2; 416/87; 416/143; 244/3.28; 244/3.29
[58] Field of Search ............... 416/131, 134 R, 134 A, 416/142, 143, 106, 107, 140 R, 87, 88, 2, 129, 128, 120, 146 R; 244/3.28, 3.29; 60/226.1

[56] References Cited

U.S. PATENT DOCUMENTS

| | | | |
|---|---|---|---|
| 3,012,767 | 12/1961 | Jones, Jr. | 416/140 |
| 3,697,019 | 10/1972 | Watson | 244/3.29 |
| 4,165,847 | 8/1979 | Detalle | 244/3.29 |
| 4,296,895 | 10/1981 | Pazmany | 244/3.29 |
| 4,817,891 | 4/1989 | Gaywood | 244/3.29 |

Primary Examiner—John T. Kwon
Attorney, Agent, or Firm—Lyon & Delevie

[57] ABSTRACT

A blade erection damper for a folding propfan blade comprising a blade hammer on the propfan blade engageable with a fluid-filled frangible capsule to dampen erection of the blade.

2 Claims, 1 Drawing Sheet

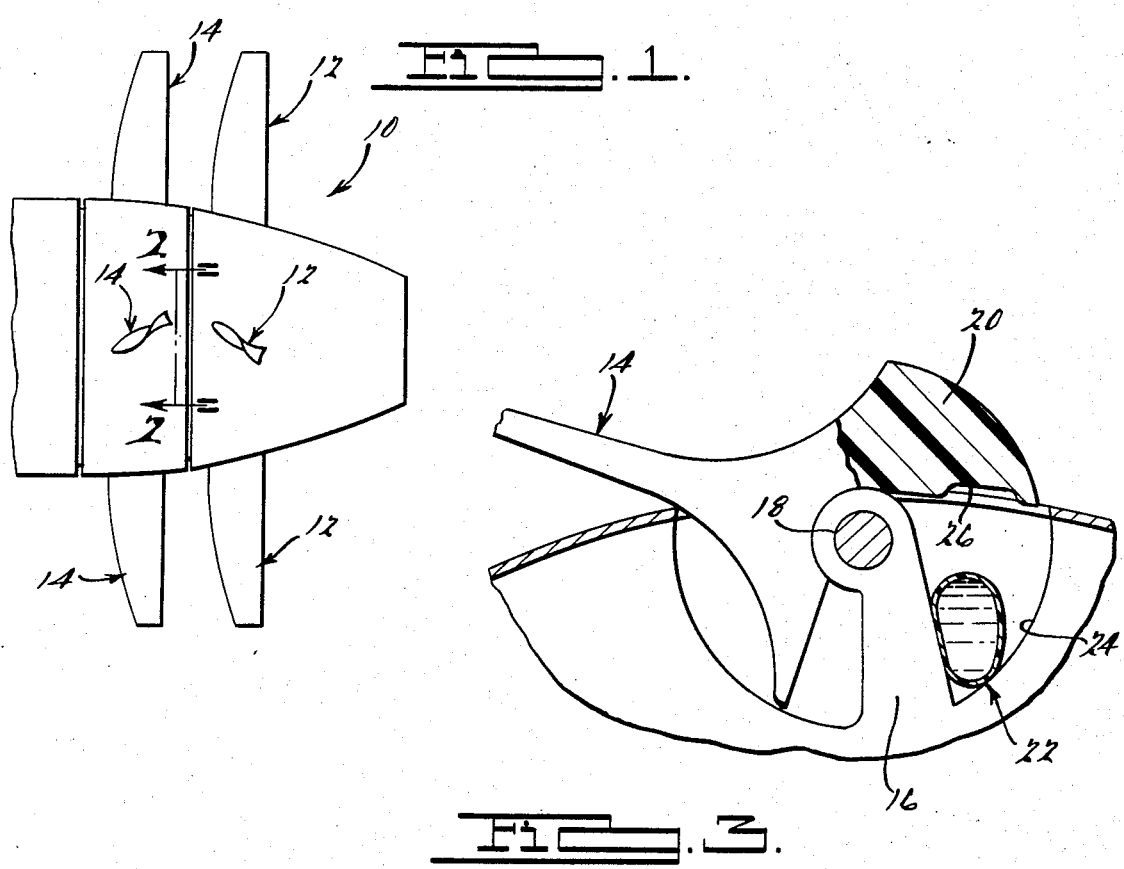
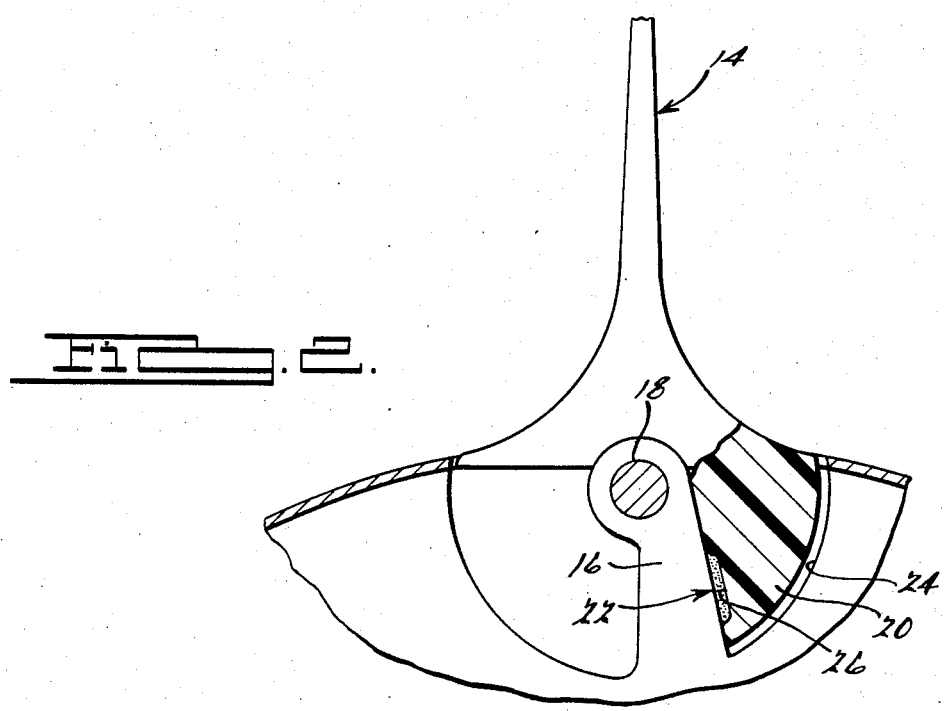

PROPFAN BLADE ERECTION DAMPER

BACKGROUND OF THE INVENTION

Small high speed propfans are rapidly gaining acceptance as an alternative to the widely used fan jet for the propulsion system of an aircraft. However, in certain applications, the relatively large diameter of a propfan blade is unacceptable. While this problem can be solved by hinging the propfan blade so that it can be folded, extension of the blade may subject the entire propulsion system to severe shock load.

SUMMARY OF THE INVENTION

The present invention relates to an erection damper for a foldable propfan blade comprising an elastomeric, fluid-filled capsule that is ruptured upon erection of the propfan blade so as to attenuate shock incident to such erection. The viscosity of the fluid encapsulated within the capsule controls the damping characteristic.

BRIEF DESCRIPTION OF THE DRAWINGS

FIG. 1 is a fragmentary elevation of a fully erected propfan propulsion system having the propfan blade damper of the instant invention;

FIG. 2 is a view taken along the line 2—2 of FIG. 1; and

FIG. 3 is a view similar to FIG. 2 with the propfan blade in the stored condition.

DETAILED DESCRIPTION OF THE PREFERRED EMBODIMENT OF THE INVENTION

As seen in FIG. 1, a propfan engine 10 comprises a row of propfan blades 12 and a counter rotating row of propfan blades 14.

As seen in FIGS. 2 and 3, a blade support 16 journals a hinge pin 18 which, in turn, pivotally supports the blade 14.

In accordance with the present invention, the blade 14 is extended radially inwardly of the hinge pin to form a sector-shaped damper hammer 20. Upon erection of the blade 14, the hammer 20 impacts against a fluid-filled elastomeric capsule 22 so as to attenuate the impact of the hammer 20 against the blade support 16. The capsule 22 is positioned against the blade support 16 in a cavity 24 having a radial cross section complementary to the blade hammer 20. The cavity 24 accepts the damper hammer 20 upon deployment of the blade 14. The elastomeric capsule 22 is preferably adhesively bonded to the propfan blade support 16.

FIG. 2 shows the extended propfan blade 14 with the hammer 20 thereof positioned against the blade support 16 after crushing of the capsule 22. Thus, the blade support 16, in combination with the damper hammer 20, functions to position and prevent overrotation of the blade 14. Damping characteristics are controlled by the size of the elastomeric capsule 22, the viscosity of the fluid therein, and by sizing the clearance between a pocket 26 on the damper hammer 20 and the blade support 16.

While the preferred embodiment of the invention has been disclosed, it should be appreciated that the invention is susceptible of modification without departing from the scope of the following claims.

I claim:

1. A blade erection damper for a folding propfan blade comprising
   a folding propfan blade journaled for rotation about an axis extending at substantially a right angle to said blade from a folded position to a run condition,
   a blade hammer on a root portion of said blade engageable with a blade support to position said blade in the run condition, and
   a frangible element disposed between said blade hammer and said blade support when said blade is in the folded condition and engageable by said blade hammer to dampen erection of said blade.

2. An erection damper in accordance with claim 1 wherein said frangible element comprises a fluid-filled frangible capsule.

* * * * *